United States Patent [19]

Finaz et al.

[11] Patent Number: 4,467,051

[45] Date of Patent: Aug. 21, 1984

[54] METHOD OF PRODUCING A CELLULAR RESIN SUITABLE FOR USE AS AN INSULATING MATERIAL

[75] Inventors: Gilles Finaz; Robert Michon; Michel Rasclard, all of Lyons, France

[73] Assignee: Societe d'Application et de Developpement de Techniques Nouvelles, S.A.D.E.V., Villeurbanne, France

[21] Appl. No.: 533,859

[22] Filed: Sep. 20, 1983

[30] Foreign Application Priority Data

Sep. 20, 1982 [FR] France .................................. 82 16071

[51] Int. Cl.³ .......................... C08J 9/02; C08G 18/48
[52] U.S. Cl. ...................................... 521/77; 521/121; 521/131; 521/180
[58] Field of Search .................. 521/180, 121, 131, 77

[56] References Cited

U.S. PATENT DOCUMENTS

| | | | |
|---|---|---|---|
| 2,911,380 | 11/1959 | Doedeus | 521/180 |
| 3,047,518 | 7/1962 | Doedeus et al. | 521/180 |
| 3,128,258 | 4/1964 | Doedeus et al. | 521/180 |
| 3,274,157 | 9/1966 | Doedeus et al. | 521/180 |
| 3,311,573 | 3/1967 | Graham et al. | 521/180 |
| 3,311,574 | 3/1967 | Bowering et al. | 521/180 |
| 3,311,575 | 3/1967 | Graham et al. | 521/180 |
| 3,415,763 | 12/1968 | Sonnabend | 521/180 |

OTHER PUBLICATIONS

Article: *Development of a Canadian Standard for Urea Formaldehyde Thermal Wall Insulation*, Thermal Insulation Performances, ASTM STP, 718—1980, pp. 361–394, (Bowles & Shirliffe).

*Primary Examiner*—Morton Foelak
*Attorney, Agent, or Firm*—Karl F. Ross; Herbert Dubno

[57] ABSTRACT

A cellular foam particularly suitable for use as thermal or accoustic insulation is produced by the condensation in an acidic medium in the presence of a catalyst hardener of methyloldihydroxydiphenylmethylene ether isomers.

15 Claims, No Drawings

METHOD OF PRODUCING A CELLULAR RESIN SUITABLE FOR USE AS AN INSULATING MATERIAL

FIELD OF THE INVENTION

Our present invention relates to a method of producing a cellular or foamed synthetic resin composition resin composition and to the composition which thus results and especially to the use of the composition as an insulating material. More particularly, the invention relates to cellular or foamed compositions obtained by the condensation of isomers of methyloldihydroxydiphenylmethylene ether.

BACKGROUND OF THE INVENTION

It is common to provide insulation for buildings, especially residences, and transport vehicles (land vehicles, maritime vehicles and aircraft), and for industrial structures such as ducts, utilizing cellular synthetic resin insulating compositions which generally are applied in the form of a liquid foam which reacts and hardens to produce the cellular product.

The reaction can be carried out in a factory by treating the industrial structure to be insulated or at the site in the case of building structures, either by casting the reactive liquid composition in a space to be provided with the insulating material, by injection of the reactive liquid into a cavity to be filled thereby, or by projecting the composition against a surface to be coated. Generally speaking these liquid reactive compositions have been urea-formaldehyde resins, polyurethane resins, epoxy resins or phenol-aldehyde (phenol-formaldehyde) resins or combinations thereof.

Because of the simplicity of application, urea-formaldehyde resins have been widely used for over 20 years in Europe and North America for the insulation of private domiciles and other structures.

Generally the reactive composition is discharged from a machine which proportions the two components in a fixed ratio with respect to one another, e.g. a 50/50 proportion by volume. The supply reservoirs of the machine thus can contain the two components, one of which is the resin in the form of an aqueous solution of a precondensate of urea-formaldehyde containing a plasticizer. The other composition can be an aqueous solution of the catalyst and the foaming agent which can include an anionic surface active agent in an acid medium. The two components are mixed, foamed in the presence of air and the resulting composition, in the form of a cream having the consistency of shaving cream, can be cast between slabs, can be injected through small holes in the space between partitions and walls, or can be coated onto structures to be provided with insulating layers.

The foam hardens in about one minute to leave a cellular material.

Initially the density of the foam depending upon the humidity, is about 40 to 48 kg/m$^3$ but after drying over a period of several days to several weeks, the density diminishes to a level between 10 and 13 kg/m$^3$. Regrettably, significant shrinkage accompanies this reduction in density and drying and is responsible for a significant loss in thermal insulating performance of the material.

An extensive study of this subject can be found in Bowles and Shirliffe: *Development of a Canadian Standard for Urea Formaldehyde Thermal Wall Insulation, Thermal Insulation Performances, ASTM STP 718* and D. L. McElroy and R. P. Tye, Editors, American Society for Testing and Materials, 1980, pp 361–394. The description of these publications can be found on page 2 of the French text.

These studies have concluded that the shrinkage can be up to about 21% by volume and it can be estimated that such shrinkage reduces the thermal performance of the material by 60% with respect to the same material hypothetically filling the original space without shrinkage.

These undesirable results have been confirmed by numerous experiences carried out utilizing urea-formaldehyde foams.

One might expect the polyurethane foams to effectively replace the urea-formaldehyde foams because of their excellent thermal properties, their desirable mechanical properties, and their good dimensional stability.

In practice, however, it is found that this is not the case. For example, it is not possible or advantageous to simply inject such materials in the space between a wall and a partition because of the sharp increase in pressure which occurs when this material is injected into a wall. The expansion pressure of the foam appears to be of the order of kg/cm$^2$ and the use of such materials require support for the walls of the cavities into which the polyurethane foam is introduced.

For example, if a metallic structure is filled in the factory with such foams, the metal panels frequently are distorted. Sandwich structures likewise formed with such foams are also distorted or deformed. If the polyurethane resin is injected between a supporting wall and a partition, the partition is frequently displaced, cracked or otherwise ruptured in a wholly unacceptable manner.

Of course, one can utilize specially reinforced partitions and other structures adapted to withstand the expansion pressures of polyurethane but, of course, this can only be done with loss of economic advantages of the polyurethane foam.

Furthermore, the polyurethane foams cannot be utilized effectively in existing structures without such reinforcements.

Polyurethane foams suitable for application by projection onto a surface have also been developed, for example, for insulating terrace roofings, albeit with the disadvantages discussed above. Furthermore, the moisture in concrete or support structures against which the polyurethane foam may be brought, tends to affect the hardening or setting of the resin. In the region where the foam contacts the support, the properties of the foam differ from those elsewhere.

Another difficulty frequently encountered in the use of polyurethane foams is the limited temperature at which it can be applied, namely, between 10° and 30° C. Thus in severe temperature extremes as may occur in the summer and in the winter, the use of polyurethane foams is drastically limited.

Yet another disadvantage of using polyurethane foams is the flammability characteristics thereof, a disadvantage which is also found with urea-formaldehyde foams.

The conventional polyurethane foams are somewhat flammable and cannot be utilized where there is a danger of ignition. This is especially the case in buildings and domiciles and for the insulation of roof, ceiling and like structures when sandwich panels are provided.

Naturally, various remedies to this problem have been developed and, for example, some firms have fabricated polyols for use in the production of polyurethane foams which enable them to be fire retardant and, for example, to conform to the M 1 class utilizing the epiradiation test described in French industrial standard NF P 92-501.

However, such foams contain nitrogen, chlorine or bromine or combinations thereof and, upon combination, emit opaque smoke or highly toxic vapors and thus, although they are less flammable, upon contact with a source of combustion, can give rise to other health disadvantages.

Epoxy resins have been found to be interesting in the production of thermally insulating foams, although their cost is so great that they have been utilized only effectively in industrial apparatus such as steam boilers of the like, which justify the higher cost. Furthermore, their combustion characteristics have limited their applicability in the same manner as polyurethane foams. Phenol-aldehyde resins, generally referred to as phenolic resins, have the advantage that they are exceptionally resistant to combustion for materials which are rich in carbon and hydrogen. Indeed, it is possible to form from them foams, which are non-flammable and are in the M 1 class for the epiradiation test as previously described.

It is for this reason that considerable effort has been expended in the development of such foams where there is a chance of combustion, for example, in building structures and in transport vehicles.

The usual method of producing a foam of a phenolic resin comprises mixing a resin known as a resol with an acidic compound in the presence of a surface active agent and a blowing agent, permitting the mixture to react under the exothermicity of the reaction until a fluid foam is formed which hardens progressively until the reaction concludes.

The resol based phenol-aldehyde resins which can be foamed in the manner described can be applied by the methods utilized with other resins, e.g. by casting, by projection onto a surface and by injection into a cavity. However, because of a variety of difficulties generally associated with the formation of a foam of such resins, the use thereof has been marginal to date.

As a matter of fact, considerable research has gone into the efforts to control the reaction and into the production of articles utilizing such resins without significant success.

For example, resol based phenol-aldehyde resins have poor reactivity. When a foamed resin is to be produced from two components, it is necessary to provide sufficient time for the two components to react in the mold or in the cavity to be filled or in the device for metering the two components into the mold or cavity. However, this time cannot be excessive because there is always the risk that the mixture will drain from the cavity, especially if the walls thereof are porous, as is the case in building structures. For urea-formaldehyde resins, the time required for the reaction is less than one minute which has been considered to be a suitable time period.

Within this time period, the foaming reactions should be rapid and hardening should follow directly with a sufficient exothermicity to completion and to eliminate volative materials.

Thus the desirable kinetic curve should increase exponentially with temperature after a period of about one minute. With resol resins, while it is possible to modify the reactivity by various means, e.g. controlling the concentration of the methylol group, the nature and concentration of the catalyst and hardener, or other aspects of the reaction, it is found that when the duration of contact is sufficient for the initial aspect of the reaction, the exothermicity of the reaction is insufficient to provide, at ambient temperature within an appropriate time of the order, say, of two minutes, a complete drying and hardening of the foam.

A second disadvantage of resol based resins used to date is that the viscosity of the resol resin for foaming is generally between 1,000 and 5,000 centipoises. It is possible to reduce this viscosity to slightly below 1,000 centipoises by increasing the concentration of water in the product but this reduces the reactivity of the resin and diminishes the properties of the final product as well as its dimensional stability. The viscosities of the resol resins which must be used do not permit the generation of light foams of the type which have been found to be satisfactory with urea-formaldehyde resins and indeed it is generally not possible to obtain a final density of the material significantly below 30 kg/m$^3$ even under the best conditions.

Still another disadvantage of resol-based resins for the purposes described is the need to utilize large quantities of hardening agent or catalyst. Because of the poor reactivity and the higher apparent density of the foam, it is generally necessary to accelerate the reaction by utilizing comparably large quantities of hardening agents or catalysts. The compounds are generally acids, for example sulfonic acids, and when these are used in excess, they tend to increase the hydrophilic character of the foam and make the same corrosive.

Yet another disadvantage of the use of resol based resins for foam insulation is the limited temperature at which the foam can be generated, generally a temperature in the range of 10° to 25° C. Below 10° C., the product is difficult to handle and there is a risk that it will solidify or plug the pumps, piping, nozzles and the mixing head. Furthermore, the reactivity is substantially reduced at temperatures below 10° C.

At temperatures about 25° C., the control fo the reaction can be lost. Consequently, one is generally limited in the time of application of the product to a narrower interval than that which has been found to be disadvantageous for the use of urea-formaldehyde resins.

It has also been found that the resol resins of conventional types have poor storage stability of shelf life. The resins tend to condense autogeneously with increase of their viscosity. The reaction occurs more readily as the storage temperature increases. Resol resins are indicated to have shelflives less than several weeks. Consequently it is difficult to stock the materials at various locations or to ship them long distances.

Finally, it should be mentioned that the conventional resol resins produce foamed products which have poor dimensional stability and which are somewhat brittle.

It has already been recognized that the mechanical strength properties of foamed resins formed from such resols are poor and especially that they have extremely low tensile strength.

Indeed, when dimensional stability is tested according to the French standard NFT 56122, i.e. after several cycles including a conditioning phase at ambient temperature and in a relatively constant humidity atmosphere, followed by a period in an oven, it is noted that there is a substantial dimensional variance. In suitable foams, this variation is minimal. A minimum variation under this test is necessary if degredation of the foam with time is to be avoided since the test represents an accelerated weathering or aging test. In fact, dimensional variations under such tests should be less than 2% and this value is difficult to guarantee when the foam is made of a resol resin of the type described.

OBJECTS OF THE INVENTION

It is, therefore, the principal object of the present invention to overcome the disadvantages described above.

A more specific object of the invention is to provide a method of making a cellular foam, particularly suitable for insulation purposes, which can be applicable in situ without any of the disadvantages outlined above in connection with resol resins.

Still another object of the invention is to provide an improved insulating material.

DESCRIPTION OF THE INVENTION

These objects and others which will become apparent hereinafter are attained, in accordance with the present invention which is based upon our discovery that it is possible to produce a cellular product wihout any of the disadvantages of earlier resol based resins by condensing at least one isomer of methylol-dihydroxy-diphenyl-dimethylene ether (MDDME) of the empirical formula $C_{15}H_{15}O_4$ and especially the 3-methylol-2,2'-dihydroxy-diphenyldimethylene ether of the structural formula:

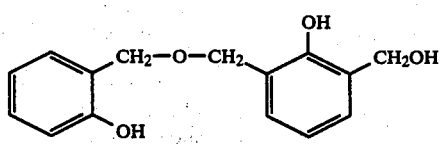

and the 3-methylol-2,4'-dihydroxy-diphenyldimethylene ether of the structural formula:

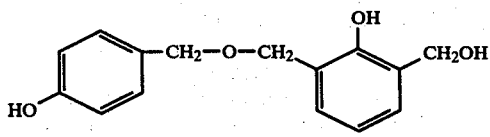

(possibly in a mixture of the two isomers).

According to a feature of the invention, the mixture is constituted primarily by or is constituted of a majority of the 3-methylol-2,2'-dihydroxy-diphenyldimethylene ether.

We have found that the use of isomers of MDDME permits the condensation to form an insulating foam which can be applied by casting, injection, projection and pulverization.

The transformation of MDDME into a resin can be effected in a manner similar to that utilized in generating foams from resol resins and utilizing the same hardening or catalytic agents. However, the chemical composition of MDDME, the kinetics of its reaction, its physical characteristics and the properties of the resins obtained differ significantly from those of the resol resins as will be detailed below:

The resol resins are polycondensates of a hydroxy aromatic compound such as penol with formaldehyde. These resols can be represented by the formula:

$$HOCH_2-ArOH-[CH_2-AROH(CH_2OH)_x]_y-H$$

in which small x represents 0 or 1 and thus indicates the number of methylol groups which can be substituted on the aromatic hydroxy moiety; small y is a highly variable integer representing the polymerization of these units and generally represents from several units to several tens of units.

The resol resins are thus characterized at a chemical level, by hydroxy aromatic moieties connected to one another by methylene groups. A certain number of these moieties can comprise in an ortho or para-position with respect to the phenolic hydroxyl group, with methylol groups apart from all other reactive functional units.

The hardening of the resol resin in the presence of acid compositions, referred to as hardeners or catalysts, is effected by a condensation of the methylol groups with the hydroxy aromatic moieties belonging to the resin itself or to the hardener. The hardeners are generally aromatic sulfonic acid and can be simple compounds such as the para-toluene sulfonic acid, hydroxybenzene sulfonic acid, etc, or sulfonic resins such as the condensate of hydroxybenzene sulfonic acid with formaldehyde.

According to conventional techniques, the hardening reaction with the resol resin gives an insoluble and non-fusible foam. The latter has a three-dimensional reticulate structure with crosslinking of the molecules as a consequence of the fact that the number of methylol groups per mole of resol resin is greater than unity.

The MDDME is a compound chemically different from the products which are condensed in the conventional resol resin and produce condensation products which are likewise different.

Firstly, the MDDME is a mixture of isomers of well defined structures as represented by the formulas given above. By contrast with resol resins, these formulas do not have any recurrent units and MDDME is readily definable by nuclear magnetic resonance spectrometry as having a molecular weight of 260.

Another important distinction is that the MDDME has a dimethylene ether group ($-CH_2-O-CH_2$) located between the two aromatic moieties of the compound. The resol resin and its condensate does not contain a corresponding internuclear chain but rather links the internuclear moieties by a methylene group which is neither reactive nor identical to the ether linkage and hence the hardening is effective exclusively by the reaction of methylol groups and the substituted aromatic moieties. The hardening kinetics of MDDME also proceed differently.

The hardening of the MDDME requires, on the one hand, the reaction with a methylol group (a group which itself cannot contribute to cross-linking and the formation of a network) and, on the other hand, the participation of the dimethylene ether group.

For a better appreciation of the invention, a reaction scheme for the hardening of the MDDME is provided below. However, the process shown is not exclusive, i.e. various other and side reactions may occur depending upon the operating conditions and the reaction sequence may differ depending upon the nature and concentration of the hardener and the temperature used. Consequently, the explanations below as to the nature of the hardening of the MDDME should not be considered to be any limitation on the invention.

The hardening of MDDME was studied at ambient temperature in the presence of acid hardeners which generally were identical to those employed for the hardening of conventional resol resins.

The polycondensation reaction (I) is initiated at the methylol group. This reaction is an ionic reaction and its velocity is initially proportional to the concentration of hydrogen ion. The methylol group condenses with a substituted hydroxyaromatic nucleus with formation of a methylene bridge and elimination of one molecule of water (reaction I below).

The reaction is accompanied by the release of heat which accelerates the decomposition in the acid medium of the dimethylene ether group with formation of an internuclear methylene bridge and elimination of a molecule of formaldehyde (reaction II) below.

The reaction synergism can be manifested by an acceleration of the temperature increase and a vaporization of by-products of the reaction.

When the dehydration is complete, the ionic reaction is terminated although the decomposition of the dimethyl ether groups can continue by a free radical reaction.

The formaldehyde generated by the reactant II has a high reactivity during the ionic reaction phase. It condenses with two substituted hydroxyaromatic nuclei and thus creates a new methylene bridge with elimination of a molecule of water. It participates essentially in a cross-linking of the polycondensate (reaction III below).

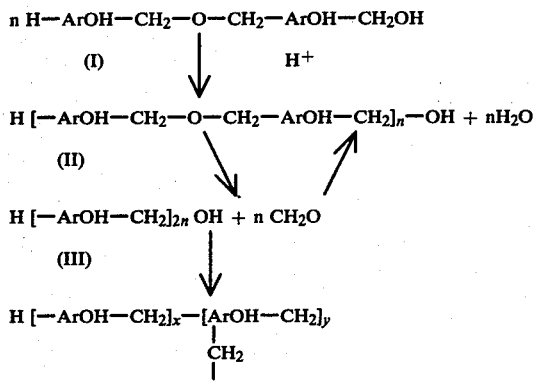

After the ionic step, the nascent formaldehyde released with the water vapor without reacting with the polycondensate, is available as a foaming agent to promote the expansion of the resin. Consequently, the transformation of the formaldehyde in cross-linking the polycondensate is incomplete.

The result is a macromolecular reticulate structure which is moderately cross-linked and which explains the particular properties of the cellular resin obtained by condensation of the MDDME, namely, high resilience and a dimensional stability much greater than that of the resol resins.

Finally, after the reaction is complete there are no longer groups available which can generate formaldehyde even when the composition is brought to an elevated temperature at which pyrolysis may occur. This too contributes to the high stability of the product.

According to the process of the present invention, the MDDME which is polymerized and cross-linked is used in the form of the crude products obtained in the fabrication of the MDDME, namely, a composition which can contain (with a variability of up to, say, 25%):

MDDME=75% by weight
Water=13.5% by weight
2,6-dimethylolphenol=5% by weight
mixture of methylolphenolisomers=4% by weight
phenol—1.2% by weight
mineral salts (catalyst residues)=1% by weight
nonidentified impurities=0.3% by weight.

The MDDME is generally in the form of a mixture of the two isomers:
3-methylol-2,2'-dihydroxy-diphenyldimethylene ether and
3-methylol-2,4'-dihydroxy-diphenyldimethylene ether.

These two isomers are generally in a weight proportion of 9 parts of the first to 1 part of the second.

The crude products described above, which is referred to as technical grade MDDME, is a clear liquid of an odor resembling that of phenol. Analyses for traces of aldehyde found none. The composition can be handled in free air without particular risk to the respiratory tract.

The characteristics of the technical grade MDDME are as follows:
viscosity measured by a Brookfield viscometer at 23° C.=170 to 180 centipoises.
Density at 25° C. $d_4^{22}=1.87$ g/cm$^2$.
pH of a 10% solution in water=7.4.

In spite of its high reactivity, the product can be stored for several months at temperatures below about 20° C. and up to about 20° C. without noticeable change in viscosity. After two months, the viscosity rises only to about 200 to 220 centipoises.

In order to obtain a foamed composition from the MDDME technical grade product, a foaming agent can be added which is insoluble and/or we can add a surface-active agent of the emulsifier class.

It is desirable that the MDDME contain a certain amount of water since this is important for the foaming. Naturally this is the case when the technical grade MDDME is used. If water is not present, water can be added so that the composition to be foamed contains between 5 and 20% by weight water.

The foaming agent can be added in an amount of 0.1 to 12% by weight of the composition to be foamed and is advantageously a liquid having a low boiling point. Preferred foaming agents include:
saturated aliphatic hydrocarbons, e.g. petroleum ether and other mixtures of hydrocarbons obtained as distillation cuts in the fractional distillation of petroleum, the cut having a distillation curve at ambient pressure running from 30° to 70° C.;
aliphatic ethers, for example ethyl ethers and especially diethyl ether; and
halogenated hydrocarbons and especially methylene chloride and certain freons such as Freon 11 (fluorotrichloromethane) and Freon 113 (1,1,2-trichloro-2,2,1-trifluoroethane).

It is also more economical to employ a mixture-foaming agent, for example Freon 113 CM which is a mixture of Freon 113 and methylene chloride.

The surface active agent is intended to produce a stable emulsion of the foaming agent in the aqueous solution of the MDDME. It is utilized in a proportion of 0.01 to 6% by weight of the composition.

Preferably the surface active agents which are used are nonionic surfactants because these have no unfavorable effect on the stability of the MDDME. Of particular value are the nonionic surfactants which are polyethoxy ethers of fatty alcohols, alkyl phenols and polysilicones.

Best results are obtained using mixtures of the surface active agents prepared such that their hydrophilic-lipophilic equilibrium point or H.L.B. point corresponds to the H.L.B point required for emulsifying the foaming agent in MDDME containing 5 to 20% by weight water.

To emulsify the petroleum ether, an emulsifying agent composition E can be used whose composition is as follows:

condensate of 4 moles of ethylene oxide (E.O.) with oleocetylic alcohol—70% by weight, nonylpehnol condensate with 4 moles of ethylene oxide (E.O.)—15%, and nonylphenol condensate with 9 moles ethylene oxide—15%.

The MDDME based foam compositions are foamed and hardened by the addition of an acid catalyst hereinafter referred to as a hardener.

Tests have shown that the velocity of the reaction of the MDDME is, at least in its initial phase, proportional to the concentration of hydrogen ions and it is possible to utilize as the hardener, those acids whose dissociation constant is sufficient to reduce the pH of water to 4 pH units and preferably below a pH of 2.

A significant number of mineral and organic compounds satisfy this requirement and indeed any mineral or organic acid capable of reducing the pH to a pH of 2 or lower will suffice.

Best results are obtained when the acidity of the mixture of the MDDME and hardener is between 0.5 and 2 pH units.

For the higher pH values, the reaction is slowed and it may be necessary to supply heat from the exterior.

At pH values above this range, the reaction is sharply slowed and it may be necessary to provide an external heating source to maintain the reaction.

At pH values below this range the reaction becomes difficult to control. Within this pH range the foamed composition of MDDME foams and hardens at initial temperatures between −5° C. and +35° C. which permit the formation of the cellular product by conventional in situ processes for insulating buildings and the like.

Care may have to be taken to avoid a strong acidity which may be responsible for hydroscopy and a corrosive character of the cellular resins which are thus produced. Preferably the acid hardeners act both as catalysts and as polycondensation agents with the MDDME, thereby removing them from availability as free acids. Consequently, it is advantageous to utilize compositions and reaction conditions such that the foaming and hardening are satisfactory but the cellular resin contains the least possible amount of free acid compounds and particularly free acid compounds which are extractable by water.

The preferred hardeners are organic sulfonic acids of the following type: containing one or more aromatic nuclei (benzenic, naphthenic) sulfonic acids;
containing a phenolic hydroxyl group on at least one of the nuclei;
containing one or more sulfonic acid groups on at least one of the nuclei; and
containing a hydrocarbon chain $C_nH_{2n}$, where n is an integer, for connecting the nuclei.

Such sulfonic acids can be employed individually or in mixtures and can be diluted with phenol to control their acidity index and hence their reactivity for foaming and hardening of the MDDME.

Specific examples of such hardeners include:

phenol sulfonic acids $C_6H_4(OH)(SO_3H)$, particularly in the form of mixtures of their isomers;

the cresolsulfonic acids $C_6H_3(CH_3)(OH)(SO_3H)$;

the naphthosulfonic acids $C_{10}H_6(OH)(SO_3H)$;

the dihydroxydiphenylmethane sulfonic acids $C_6H_4OH—CH_2—C_6H_3(OH)(SO_3H)$;

the dihydroxydiphenylpropane sulfonic acids $C_6H_4OH—C(CH_3)_2C_6H_3(OH)(SO_3H)$;

the dihydroxydiphenylbutane sulfonic acids $C_6H_5(OH)—C—(CH_3)(C_2H_5)C_6H_3(OH)(SO_3H)$; and the polyhydroxyphenylmethylene sulfonic acids $H—[C_6H_2(OH)(SO_3H)—CH_2]_n—C_6H_3(OH)(SO_3H)$; and polysulfonic acids obtianed by partial sulfonation of liquid novalac resins.

The formula of these acids is similarly to the formulas given previously but the number of sulfonic groups is less than the number of hydroxyphenyl nuclei. The liquid novolac resins are themselves obtained by a condensation of phenol with formaldehyde in the presence of an acid catalyst and with a molar ratio of phenol:formaldehyde greater than 1.

EXAMPLE 1

The foaming composition is obtained by the addition to 100 parts by weight of technical grade MDDME as defined previously, of emulsifier E as a surface active agent (3 parts by weight) and 8 parts by weight of petroleum ether. The hardener is prepared by mixing 77 parts by weight of technical grade phenolsulfonic acid with 23 parts by weight of crystallized phenol containing 10% water. Using a turbine stirrer, for especially vigorous agitation, 1000 g of the foamed composition are mixed with 250 g of the hardener. After 20 seconds of agitation, the mixture begins to foam and assumes the appearance of a cream.

This cream is cast into a cylindrical cavity having a volume of 100 l. The foam develops intensively and overflows the cylinder. The volatile material is evolved in the form of a gas and 3 minutes after mixing of the two components and about 2 minutes after expansion begins, the foam being hot is totally hardened and dry.

Samples are cut from the molded body and tests of properties are carried out with the following results:

apparent density: 10.6 kg/m³;
resistance to compression: 0.3 kg/cm²;
dimensional stability according to the French standard NFT 56122: variation less than 1%;
thermal conductivity W/mK=0.030;
fire-retardant tests according to the epiradiation test previously described: the material is class M1.

The remainder of the block is comminuted in a blade grinder to form granules with a particle size between 0.5 cm and 6 cm. The apparent density of the granules is 8 to 9 kg/m³. These granules can be filled directly into a space to be thermally insulated.

EXAMPLE 2

Foamable Composition:

Technical grade MDDME: 100 parts by weight;
surface active agent of the silicone type (DC 193 marked by Dow-Corning): 2 parts by weight;

trichlorofluoromethane (Freon 11): 2 parts by weight;
1,1,2-trifluoro-2,2,1-trichloroethane (Freon 113): 2 parts by weight;
methylene chloride: 2.5 parts by weight.

Hardener:

The hardener is prepared by sulfonation, with 77 parts by weight of 95% sulfuric acid, of a mixture constituted by 51.5 parts by weight of dihydroxydiphenylmethane and 48.5 parts by weight of phenol.

Fabrication of Insulating Panels:

The foaming composition and the hardener are introduced into respective reservoirs of a two component machine for applying reactive systems with variable volumetric proportions. The ratio of the two components is set so that 15 parts by weight of the hardener is combined with 100 parts by weight of the foaming formulation. The two components are mixed in a dynamic head and are cast in an amount of 4.5 kg of the composition into a closed parallelopipidal mold having dimensions of 3 m×1 m×0.06 m.

The casting time is 10 seconds and corresponds for the time for delivery of 4.5 kg from the head. After 3 minutes, the mold is opened and the hardened and nonsticky pannel is withdrawn.

The pannel has the following characteristics:
apparent volumetric mass (apparent density): 24 kg/m$^3$;
resistance to compression: 0.6 kg/cm$^2$;
dimensional stability as measured in the manner described: variations less than 1%;
thermal conductivity in W/mK: 0.032;
flammability test: class M1.

A determination of the combustion and pyrolysis products was carried out by burning 1 g of the material in a quartz tube in a tube furnace at 700° C. while passing a current of air at a constant rate through the tube. The gaseous products were 2800 mg of carbondioxide gas and 330 mg of carbon monoxide gas. No halogen or cyanide was detected.

EXAMPLE 3

Foaming Composition
Technical grade MDDME: 100 parts by weight;
surface active agent Atmer 171 marketed by the Atlas Chemical Company: 1.5 parts by weight;
trichlorofluoromethane (Freon 11): 2.5 parts by weight;
1,1,2-trichloro-2,2,1-trifluoroethane (Freon 113): 2.5 parts by weight.

Hardener:
The hardener of Example 2: 30 parts by weight;
phenolsulfonic acid: 20 parts by weight.

Insulation of Dwelling Walls with Evacuation of Air

A machine is used of the type for two component application with a volumetric ratio of 100/30. The two components are charged into the reservoir of this machine and are displaced independently via pneumatic pumps through a tubular hose of a length of 50 m. At the end of this hose, a static mixing piston having air injection is provided to mix the two components and entrain them in an air stream into the wall.

To permit the evacuation of air within the wall, e.g. between a partition and a structural wall, small orifices at regular intervals spaced about 1 m are provided along the wall. At one end of the wall, the end of the gun is introduced into the orifices and the mixture is blown into the space between the wall. The gun is moved from orifice to orifice, thereby filling the wall and driving the air from the latter. The foaming time requires about 20 seconds and allows the insulation of 60 m$^2$ of wall with a void thickness of 6 cm per hour. This rate has been found to be extremely satisfactory in practice.

The operation is effective at ambient temperatures between −5° C. and +35° C.

Filling of hollow metallic Structure of a Thickness of 8 cm for Preparation of a Curtain Wall:

The technique previously described for the insulation of a dwelling wall is used although here the operation is carried out in the factory. After filling of the hollow metallic wall structure with the cellular resin, no deformation of the metallic structure is noted.

Roof Insulation

The formulations of the previous examples are used in a machine for injecting the resin into the spaces between the joists of a roof. The material is applied against the inner surface of the roof to a thickness of 20 cm in the single pass.

The apparent density of the cellular resin measured by samples taken from the product show that the product has a density of 18 to 20 kg/m$^3$, depending upon thickness, when applied by injection, but about 12 kg/m$^3$ when applied by expansion after spreading upon the roof surfaces.

EXAMPLE 4

Foaming Composition: identical to that of Example 3;
Hardener: identical to that of Example 2.

Insulation by Spraying of the Foundation of a Building

The machine described in Example 3 is modified to deliver a fixed ratio of the two components at 100/100 parts by weight. The combination is pulverized and sprayed on the basement to produce a cellular resin having a thickness of about 3 cm. The foaming and the hardening appear practically instantaneously so that there is no danger of flow. The apparent volumetric mass of the insulating layer varies between 25 and 35 kg/m$^3$.

The compressure resistance of the product exceeds 1 kg/cm$^2$.

EXAMPLE 5

Foaming Composition: that of Example 2;
Hardener: sulfonated novolac-type Alveophen 76058 as produced by the SHEBY division of the URACHEM. Group.

Production of insulating Panels:

The ratio between the two components, namely, the foam/hardener ratio is 100/20.

The method used was that of Example 2 and the casting time was 16 seconds and corresponded to the delivery of a weight of 7.2 kg of the product. The product hardened over a period of 5 minutes. The characteristics of the panel are the following:
apparent volumetric mass (apparent density): 38 kg/m$^3$;
resistance to compression: 1.2 kg/m$^3$;
dimensional stability: variation less than 1%;
thermal conductivity in W/mK: 0.034;
flammability test: class M1.

We claim:

1. A method of producing a cellular resin which comprises the steps of condensing at least one methyloldihydroxydiphenylmethylene ether isomer of the empirical formula $C_{15}H_{16}O_4$.

2. The method defined in claim 1 in which the isomer is at least one of the following isomers:
the 3-methylol-2,2'-dihydroxy-diphenylmethylene ether of the formula:

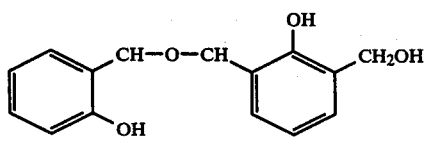

or the 3-methylol-2,4'-dihydroxy-diphenylmethylene ether of the formula:

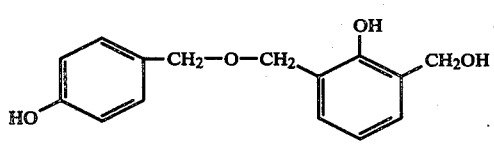

3. The method defined in claim 1 wherein said isomer is present in the form of technical grade methylol-dihydroxy-diphenylmethylene ether in a mixture containing methylol dihydroxy-diphenylmethylene ether together with water, methylol phenol and dimethylol phenol in the presence of a foaming agent, a surface active agent and a hardener.

4. The method defined in claim 1 wherein the reaction is carried out with a foaming agent content of 0.1 to 12% by weight and a surface active agent content between 0.01 and 6% by weight.

5. The method defined in claim 1 wherein the foaming agent is a saturated aliphatic hydrocarbon, an aliphatic ether or a halogenated hydrocarbon.

6. The method defined in claim 1 wherein the catalyst hardener used is selected to bring the pH during the reaction to below 4.

7. The method defined in claim 6 wherein the catalyst hardener is at least organic sulfonic acid comprising at least one aromatic nucleus, a phenolic hydroxyl group on at least one aromatic nucleus, at least one sulfonic acid group per molecule.

8. The method defined in claim 7 wherein the sulfonic acid is selected from the group which consists of phenolsulfonic acids and isomers thereof, cresolsulfonic acids naphthosulfonic acids, dihydroxydiphenylmethane sulfonic acids, dihydroxydiphenylpropane sulfonic acids, dihydroxydiphenylbutane sulfonic acids, polyhydroxyphenylmethylene sulfonic acids and polysulfonic acids obtained by the partial sulfonation of liquid novolac resins.

9. The method defined in claim 1 wherein the condensation is carried out by mixing the catalyst hardener and a foaming composition containing methylol dihydroxydiphenylmethylene ether and thereafter casting the resulting composition.

10. The method defined in claim 1 wherein the condensation is carried out by mixing the catalyst hardener and a foaming composition containing methylol dihydroxydiphenylmethylene ether and thereafter projecting the resulting composition on a surface to enable said composition to foam thereon.

11. The method defined in claim 1 wherein the condensation is carried out by mixing the catalyst hardener and a foaming composition containing methylol dihydroxydiphenylmethylene ether and thereafter injecting the resulting composition into a wall space adapted to insulate two zones from one another.

12. The method defined in claim 1 wherein the condensation is carried out by mixing the catalyst hardener and a foaming composition containing methylol dihydroxydiphenylmethylene ether and thereafter dispersing the resulting composition and permitting particles thereof to expand and harden.

13. The method defined in claim 9, further comprising comminuting the cast product thus produced to form insulating granules therefrom.

14. The product made by the method of claim 1.

15. Insulation between walls made by the method of claim 1.

* * * * *